United States Patent
Friell et al.

(10) Patent No.: US 11,696,535 B2
(45) Date of Patent: Jul. 11, 2023

(54) AUTONOMOUS GROUND SURFACE TREATMENT SYSTEM AND METHOD OF OPERATION OF SUCH A SYSTEM

(71) Applicant: THE TORO COMPANY, Bloomington, MN (US)

(72) Inventors: Joshua Craig Friell, Minneapolis, MN (US); Jackie R Gust, Northfield, MN (US); Alexander Steven Frick, Farmington, MN (US)

(73) Assignee: THE TORO COMPANY, Bloomington, MN (US)

( * ) Notice: Subject to any disclaimer, the term of this patent is extended or adjusted under 35 U.S.C. 154(b) by 193 days.

(21) Appl. No.: 17/290,907

(22) PCT Filed: Nov. 18, 2019

(86) PCT No.: PCT/US2019/061962
§ 371 (c)(1),
(2) Date: May 3, 2021

(87) PCT Pub. No.: WO2020/112401
PCT Pub. Date: Jun. 4, 2020

(65) Prior Publication Data
US 2021/0368696 A1 Dec. 2, 2021

Related U.S. Application Data

(60) Provisional application No. 62/876,086, filed on Jul. 19, 2019, provisional application No. 62/772,231, filed on Nov. 28, 2018.

(51) Int. Cl.
*E01C 23/07* (2006.01)
*A01G 20/30* (2018.01)
(Continued)

(52) U.S. Cl.
CPC ............ *A01G 20/30* (2018.02); *A01B 69/008* (2013.01); *A01C 21/00* (2013.01); *A01G 20/18* (2018.02);
(Continued)

(58) Field of Classification Search
CPC ....... A01C 21/00; A01C 20/30; A01B 69/008; B60P 3/064; E01C 11/005; E01C 19/16;
(Continued)

(56) References Cited

U.S. PATENT DOCUMENTS 5,439,313 A * 8/1995 Blaha ...................... E01C 19/46
404/101
5,502,957 A 4/1996 Robertson
(Continued)

FOREIGN PATENT DOCUMENTS

AU 2009202785 * 7/2009 ............ A01M 21/04
DE 20 2013 1 03 134 U1 10/2014
(Continued)

OTHER PUBLICATIONS

U.S. Appl. No. 62/772,231, "Autonomous Ground Surface Treatment Systems, Vehicles, and Methods", filed Nov. 28, 2018.
(Continued)

*Primary Examiner* — Raymond W Addie
(74) *Attorney, Agent, or Firm* — Mueting Raasch Group

(57) ABSTRACT

An autonomous ground maintenance system comprising a vehicle comprising a chassis supported upon a ground surface by ground support members, a container supported by the chassis, the container defining a discharge outlet operable to disperse treating material held within the container to a target area of the ground surface, a gate adapted to selectively open and close the discharge outlet, a sensor adapted to identify the target area, and an electronic controller supported by the chassis, the controller being in
(Continued)

communication with the sensor and the gate. The controller is adapted to position the chassis at a location proximate the target area such that the discharge outlet is capable of delivering the treating material to the target area and energize the gate to open the discharge outlet.

20 Claims, 9 Drawing Sheets

(51) Int. Cl.
| | | |
|---|---|---|
| *A01G 20/18* | (2018.01) | |
| *A01B 69/04* | (2006.01) | |
| *A01C 21/00* | (2006.01) | |
| *B60P 3/06* | (2006.01) | |
| *E01C 11/00* | (2006.01) | |
| *E01C 19/16* | (2006.01) | |
| *E01C 19/20* | (2006.01) | |
| *E01C 23/06* | (2006.01) | |
| *G05D 1/02* | (2020.01) | |

(52) U.S. Cl.
CPC ............ *B60P 3/064* (2013.01); *E01C 11/005* (2013.01); *E01C 19/16* (2013.01); *E01C 19/20* (2013.01); *E01C 23/06* (2013.01); *G05D 1/028* (2013.01); *G05D 2201/0202* (2013.01)

(58) Field of Classification Search
CPC ......... E01C 19/20; E01C 23/06; G05D 1/028; G05D 2201/0202
USPC ................. 404/72, 75, 84.05–90, 107, 117
See application file for complete search history.

(56) References Cited

U.S. PATENT DOCUMENTS

| | | | |
|---|---|---|---|
| 7,613,552 | B2 | 11/2009 | Bernini |
| 7,716,773 | B1 | 5/2010 | Pahl et al. |
| 8,205,681 | B1 | 6/2012 | Pahl et al. |
| 8,285,435 | B2 | 10/2012 | Bernini |
| 8,308,394 | B2 * | 11/2012 | Whitley ................... E01C 23/06 404/101 |
| 8,781,627 | B2 | 7/2014 | Sandin et al. |
| 9,491,902 | B1 * | 11/2016 | Kinkead ............... A01C 17/001 |
| 9,510,505 | B2 | 12/2016 | Halloran et al. |
| 9,804,604 | B2 | 10/2017 | Mattsson et al. |
| 10,034,421 | B2 | 7/2018 | Doughty et al. |
| 10,058,087 | B2 | 8/2018 | Henderson |
| 10,067,232 | B2 | 9/2018 | Halloran et al. |
| 10,104,835 | B2 | 10/2018 | Köhler et al. |
| 10,157,334 | B2 | 12/2018 | Schepelmann et al. |
| 10,185,317 | B2 | 1/2019 | Pichlmaier et al. |
| 10,194,649 | B2 | 2/2019 | Henderson |
| 10,310,510 | B2 | 6/2019 | Mannefred et al. |
| 10,609,862 | B2 | 4/2020 | Wu et al. |
| 11,339,540 | B1 * | 5/2022 | Cobb ....................... E01C 19/45 |
| 2003/0155453 | A1 * | 8/2003 | Kinkead ............... E01C 19/203 239/673 |
| 2011/0070024 | A1 * | 3/2011 | Kleiger ................. E01C 23/065 404/90 |
| 2011/0200389 | A1 * | 8/2011 | Whitley .................. E01C 23/06 404/101 |
| 2016/0032536 | A1 * | 2/2016 | Reda ....................... E01C 23/06 404/75 |
| 2016/0032540 | A1 | 2/2016 | Reda |
| 2016/0060822 | A1 * | 3/2016 | Kanerva ................ H04N 7/181 404/84.05 |
| 2016/0145814 | A1 | 5/2016 | Dwegerser |
| 2017/0127607 | A1 | 5/2017 | Mannefred et al. |
| 2017/0131718 | A1 | 5/2017 | Matsumura et al. |
| 2017/0251060 | A1 | 8/2017 | Larsén et al. |
| 2017/0303466 | A1 | 10/2017 | Grufman et al. |
| 2018/0038993 | A1 | 2/2018 | Jägenstedt et al. |
| 2018/0077882 | A1 | 3/2018 | Gilliam et al. |
| 2018/0084741 | A1 | 3/2018 | Gilliam et al. |
| 2018/0213731 | A1 | 8/2018 | Wykman et al. |
| 2018/0348787 | A1 | 12/2018 | Sandin et al. |
| 2019/0278269 | A1 | 9/2019 | He et al. |

FOREIGN PATENT DOCUMENTS

| | | |
|---|---|---|
| EP | 0959179 A2 | 11/1999 |
| EP | 3236732 B1 | 12/2019 |
| EP | 2785168 B1 | 5/2021 |
| EP | 3324727 B1 | 8/2021 |
| WO | 2014007627 A1 | 1/2014 |
| WO | 2016097897 A1 | 6/2016 |
| WO | 2016103071 A1 | 6/2016 |
| WO | 2018/014838 | 1/2018 |
| WO | 2018132650 A1 | 7/2018 |
| WO | 2020112401 A2 | 6/2020 |
| WO | 2020173592 A1 | 9/2020 |
| WO | 2020173593 A1 | 9/2020 |

OTHER PUBLICATIONS

U.S. Appl. No. 62/876,086, "Autonomous Ground Surface Treatment Systems, Vehicles, and Methods", filed Jul. 19, 2019.
Invitation to Pay Additional Fees and Where Applicable, Protest Fee for PCT/US2019/061962 dated Mar. 6, 2020, 16 pages.
International Search Report and Written Opinion for PCT/US2019/061962 dated Jun. 24, 2020, 24 pages.
International Preliminary Report on Patentability for PCT/US2019/061962 dated Jun. 10, 2021, 15 pages.
Tora "Workman HD Series Utility Vehicles" Product Brochure, The Toro Company, Bloomington, MN, USA. Copyright 2016, 12 pages.
Examination Report (Communication pursuant to Article 94(3) EPC for European Patent Application No. 19 817 890.7 dated Feb. 7, 2023, 9 pages.

* cited by examiner

AUTONOMOUS GROUND SURFACE TREATMENT SYSTEM AND METHOD OF OPERATION OF SUCH A SYSTEM

The present application is a 35 U.S.C. § 371 U.S. National Stage of International Application No. PCT/US2019/061962, filed Nov. 18, 2019, which claims priority to and/or the benefit of U.S. Provisional Patent Application Nos. 62/876,086, filed Jul. 19, 2019; and 62/772,231, filed Nov. 28, 2018, all of the above of which are incorporated herein by reference in their respective entireties.

Embodiments of the present disclosure relate to autonomous and semi-autonomous ground surface treatment systems and methods including, for example, vehicles adapted to autonomously detect ground surface (e.g., turf) damage and, in some embodiments, autonomously repair such damage.

BACKGROUND

Turf maintenance involves a wide range of equipment used to promote a uniform surface on both natural and synthetic turf. For example, to maintain quality and appearance, top-dressing equipment is often used to apply particulate to both natural and synthetic turf surfaces, while grooming devices (e.g., rakes and blades) are used to level and smooth the particulate once applied.

In practice, before using such equipment and procedures, the damaged turf surfaces may first be identified and flagged for repair. Once identified, an operator typically transports the repair equipment to the location and then manually performs (or manually operates one or more machines to perform) the needed repairs. Depending on the location and number of the areas that require repair and the degree of damage, such repair procedures may be time-consuming.

SUMMARY

Embodiments described herein may provide an autonomous ground maintenance system including: a vehicle comprising a chassis supported upon a ground surface by ground support members; a container supported by the chassis, the container defining a discharge outlet operable to disperse treating material held within the container to a target area of the ground surface; a gate adapted to selectively open and close the discharge outlet; a sensor adapted to identify the target area; and an electronic controller supported by the chassis. The controller is in communication with the sensor and the gate, wherein the controller is adapted to: position the chassis at a location proximate the target area such that the discharge outlet is capable of delivering the treating material to the target area; and energize the gate to open the discharge outlet.

In another embodiment, an autonomous turf maintenance system is provided including: a vehicle comprising a chassis supported upon a turf surface by ground support members, wherein one or more of the ground support members comprises a drive member adapted to propel and steer the vehicle over the turf surface; one or more motors adapted to power the drive member; a sensor adapted to identify a target area of the turf surface; and an electronic controller supported by the chassis, the controller in communication with the sensor and the one or more motors, wherein the controller, via the sensor, is adapted to record a geographic location of the target area.

In still another embodiment, a method of operating an autonomous turf maintenance vehicle is provided, the method comprising: establishing a work region in which the vehicle will operate, the work region comprising a turf surface; transporting the vehicle to the work region; autonomously operating the vehicle across the work region; controlling operation of the vehicle with an electronic controller associated with the vehicle; identifying, within the work region, a target area of the turf surface; and recording a geographic location of the target area.

In yet another embodiment, a method of operating an autonomous turf maintenance vehicle is provided, the method comprising: establishing a work region in which the vehicle will operate, the work region comprising a turf surface; and transporting the vehicle to the work region. The vehicle includes: a chassis supported upon the turf surface by ground support members, wherein one or more of the ground support members comprises a drive member adapted to propel and steer the vehicle over the turf surface; one or more motors adapted to power the drive member; and a container supported by the chassis, the container comprising a discharge outlet operable to transfer treating material held within the container to a target area of the turf surface; a sensor adapted to identify the target area; and an electronic controller supported by the chassis, the controller in communication with the sensor and the one or more motors. The method further includes: autonomously propelling the vehicle across the work region; and autonomously identifying, with the sensor, the target area.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
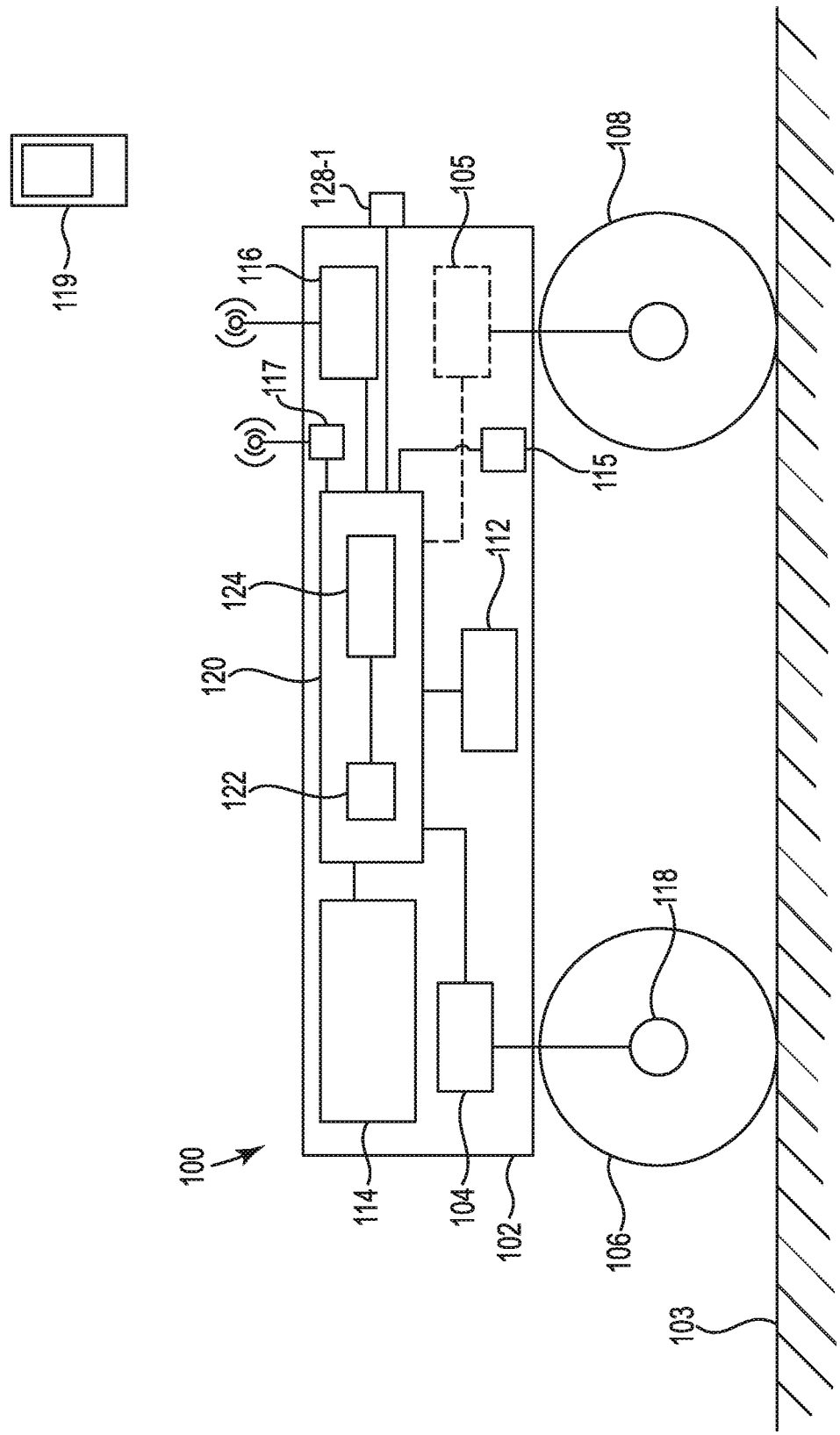
FIG. 1 is a schematic view of an autonomous ground surface treatment vehicle, e.g., a turf repair vehicle, in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. Still further, "i.e." may be used as an abbreviation for the Latin phrase id est and means "that is," while "e.g." is used as an abbreviation for the Latin phrase exempli gratia and means "for example."

Embodiments of the present disclosure provide autonomous ground surface maintenance vehicles and systems, as well as methods of operating (e.g., autonomously or semi-autonomously) the same within a work region (area within which the vehicle will autonomously operate) to assist with identifying and/or repairing damaged areas of a ground surface. For example, the vehicle may be an autonomous turf repair vehicle adapted to detect or otherwise identify an area of damaged turf (a "target area") such as a divot or rut on a golf course, and to autonomously deliver to the target area a treating material. As used herein, the term "treating material" may include any one, or a combination, of organic and synthetic turf infill, seed, particulate matter (e.g., sand, soil, granular fertilizer or chemicals), and liquid (e.g., liquid fertilizer or chemicals). In some embodiments, the vehicle may identify and flag target areas for subsequent treatment, while in other embodiments, the vehicle may autonomously perform the turf repair operation upon identification of the target area.

While described herein as a robotic turf evaluation/repair vehicle, such a configuration is exemplary only as systems and methods described herein also have application to other operated vehicles including, for example, vehicles adapted to identify and/or repair artificial fields and soil and paved (e.g., concrete, asphalt) surfaces as well.

It is noted that the terms "have," "includes," "comprises" and variations thereof do not have a limiting meaning and are used in their open-ended sense to generally mean "including, but not limited to," where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the vehicle 100 is in an operating configuration (e.g., while the vehicle 100 is positioned such that wheels 106 and 108 rest upon a generally horizontal ground surface 103 as shown in FIG. 1). These terms are used only to simplify the description, however, and not to limit the interpretation of any embodiment described.

With reference to the figures of the drawing, wherein like reference numerals designate like parts and assemblies throughout the several views, FIG. 1 illustrates an autonomous ground maintenance vehicle (e.g., a robotic turf repair vehicle 100), which may form part of a ground repair system that includes various other components, some of which are described in more detail below (for simplicity of description, the vehicle 100 is illustrated schematically in the figures).

As shown in FIG. 1, the vehicle 100 may include a frame or chassis 102 that carries and/or encloses various components of the vehicle as described below. The vehicle 100 may further include ground support members, e.g., one or more (two) rear wheels 106 and one or more (two) front wheels 108, that support the chassis 102 upon a ground surface (also referred to herein as a grass or turf surface) 103.

The vehicle 100 may include a container 110 (not shown in FIG. 1 but see FIG. 2) supported by the chassis and adapted to hold a volume of treating material 109. For example, the container may be configured as a hopper adapted to hold a volume of particulate matter as shown. The particulate matter may be loose particulate or could be configured as a plurality of packages 107 containing the material 109, or a combination of both. The packages 107 may be beneficial as they may be more easily transferred to the container 110 and, as further described below, could be sliced open before dispersal to a target area. The container 110 may also define or include a discharge outlet 111 operable to disperse, transfer, or otherwise dispense material 109 held within the container 110 to a target area 201 of the ground surface 103. The discharge outlet 111 may be selectively opened and closed via a gate 126 movable by a gate actuator 112.

One or both of the rear wheels 106 may form a drive member adapted to propel and steer the vehicle 100 over the ground surface 103. In some embodiments, the front wheels 108 may freely caster relative to the chassis 102 (e.g., about vertical axes). In such a configuration, vehicle direction may be controlled via differential rotation of the two rear wheels 106 in a manner similar to a conventional zero-turn-radius (ZTR) riding vehicle (note that, while only right wheels 106 and 108 are visible in FIG. 1, the vehicle 100 may include corresponding left wheels 106 and 108). That is to say, a separate motor 104 (which may each be in communication with a controller 120 supported by the chassis 102) may be provided to separately power each of a left and right rear wheel 106 so that speed and direction of each rear wheel may be independently controlled. In other embodiments, the drive wheels could be powered by a single motor (e.g., through a conventional transmission or transaxle). In addition or alternatively, the front wheels 108 could be actively steerable (e.g., using one or more steer motors 105) to assist with control of vehicle 100 direction, and/or could be driven (i.e., to provide a front-wheel or all-wheel-drive vehicle). In yet other embodiments, all four wheels could be conventionally steerable. Such a configuration may allow generally omni-directional movement of the vehicle 100, permitting it to translate in any direction in addition to conventional and/or differentially-driven turning.

While described herein as a four wheeled, rear- or all-wheel drive vehicle, such a configuration is not limiting. For example, the vehicle could be a tri-wheel configuration, wherein two drive wheels (located at the front or rear) are used to differentially steer the vehicle, and/or one or more wheels are used to conventionally steer the vehicle.

When the one or more motors 104 are energized, the vehicle 100 may be propelled and steered over the ground surface 103. That is to say, the controller 120 may cause the vehicle 100 to be autonomously propelled or transported across the work region to a location proximate the target area 201 such that the discharge outlet 111 is able to deliver the treating material 109 to the target area. The controller 120 may then energize the gate (the actuator 112) to open the discharge outlet as described below.

The exemplary vehicle 100 may further include a power source, which in one embodiment, is a battery 114 having a lithium-based chemistry (e.g., lithium-ion). Other embodiments may utilize batteries of other chemistries, or other power source technologies (e.g., solar power, fuel cell, internal combustion engines) altogether, without departing from the scope of this disclosure.

The vehicle 100 may further include one or more sensors adapted to provide location data. For instance, some embodiments may include a positioning system (e.g., global positioning system (GPS) receiver 116 and/or other position system that may provide similar data) adapted to estimate a position of the vehicle 100 and provide such information to the controller 120. As an example of the latter, one or more of the wheels 106, 108 (e.g., both rear wheels 106) may include encoders 118 that provide wheel rotation/speed information that may be used to estimate vehicle position (e.g., based upon an initial start position) within a given work region. Other sensors (e.g., dead reckoning, machine vision, infrared detection, beacon triangulation, radio detection and ranging (radar), light detection and ranging (lidar), etc.) now known or later developed may also be incorporated into the vehicle 100. In still other embodiments, the vehicle 100 may further include a sensor 115 adapted to detect a boundary wire when the latter is used to define a boundary of the work region, or to define a path to the work region.

As shown in FIG. 1, the vehicle 100 may also include the electronic controller 120 adapted to monitor and control various vehicle functions. The exemplary controller 120 may include a processor 122 that receives various inputs and executes one or more computer programs or applications stored in memory 124. The memory 124 may include computer-readable instructions or applications that, when executed, e.g., by the processor 122, cause the controller 120 to perform various calculations and/or issue commands. That is to say, the processor 122 and memory 124 may together define a computing apparatus operable to process input data and generate the desired output to one or more components/devices. For example, the controller may be operatively connected to the positioning system such that the processor 122 may receive various input data including positional data from the GPS receiver 116 and/or encoders 118 (or other position data), and generate speed and steering angle commands to the motor(s) 104 to cause the drive wheels 106 to rotate (at the same or different speeds and in the same or different directions). In other words, the controller 120 may control the steering angle and ground speed (the speed and direction) of the vehicle 100, as well as the delivery of treating material 109 as further described below.

In view of the above, it will be readily apparent that the functionality of the controller 120 may be implemented in any manner known to one skilled in the art. For instance, the memory 124 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 124 and the processor 122 could be contained in separate modules.

The processor 122 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 122 may include multiple components, such as any combination of one or more microprocessors, one or more controllers, one or more DSPs, one or more ASICs, and/or one or more FPGAs, as well as other discrete or integrated logic circuitry. The functions attributed to the controller 120/processor 122 herein may be embodied as software, firmware, hardware, or any combination thereof.

In FIG. 1 (as well as in FIG. 2), schematic connections are generally shown between components such as the controller 120, battery 114, motor(s) 104, a gate actuator 112 (described below), optional boundary wire sensor 115, wireless radio 117 (which may communicate with, for example, a remote computer 119 such as a mobile device/phone, desktop computer, local or "cloud"-based (internet-connected) server), and GPS receiver 116. This interconnection is exemplary only as the various subsystems of the vehicle 100 could be connected in most any manner, e.g., directly to one another, wirelessly, via a bus architecture (e.g., controller area network (CAN) bus, ethernet, etc.), or any other connection configuration that permits data and/or power to pass between the various components of the vehicle.

Figure 2:
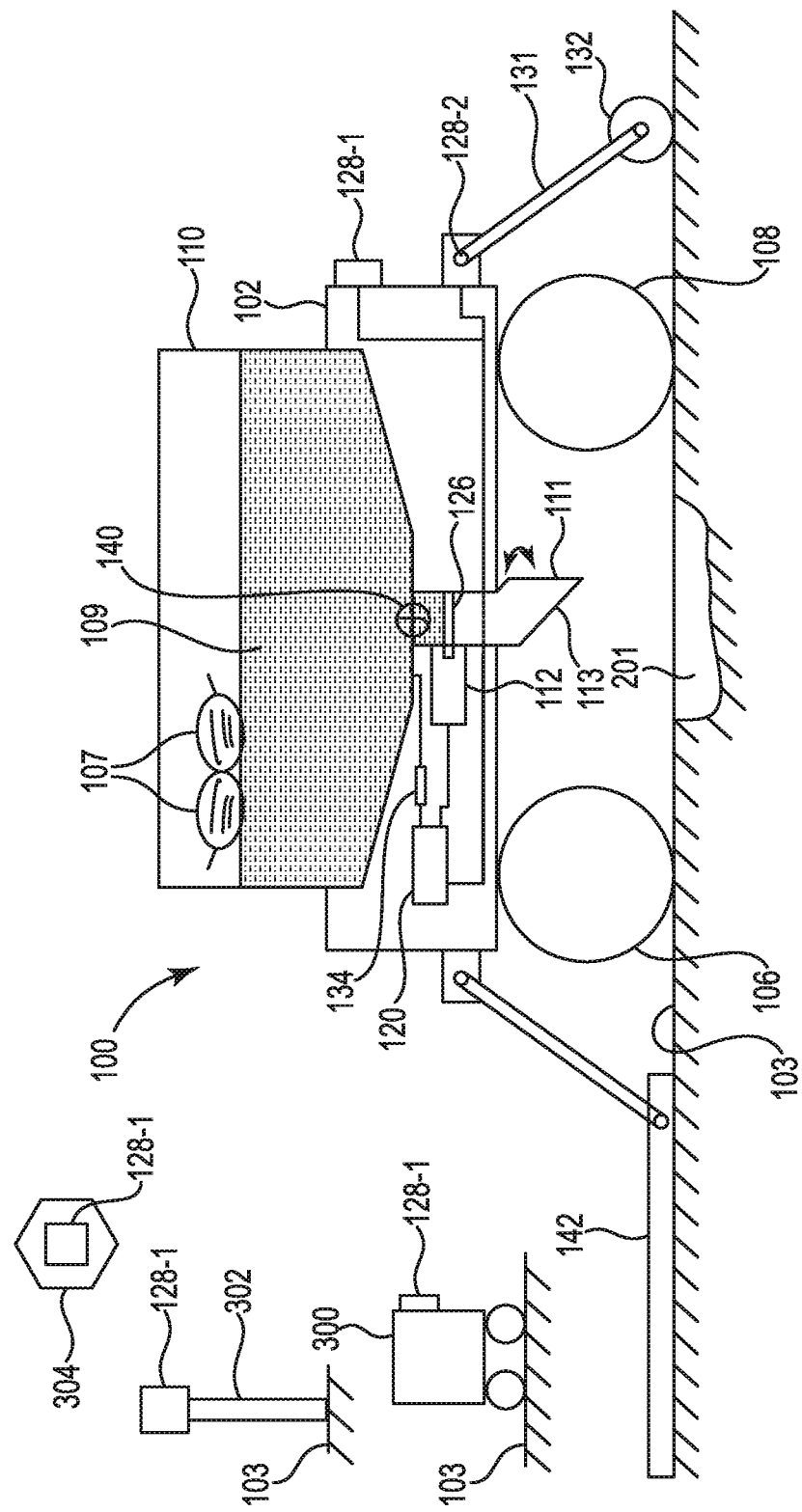
FIG. 2 is another schematic view of the turf repair vehicle of FIG. 1, further illustrating aspects used to identify and treat turf damage.

The exemplary vehicle 100 is shown in FIG. 2 with various structure described above removed to better illustrate aspects of the container 110 and material delivery components. As indicated in this view, the container 110 (also referred to herein as the "hopper") may be supported by the chassis 102. The hopper 110 is adapted to receive and store the treating material 109 therein. As stated above, the hopper 110 may hold treating material 109 in most any configuration including, granular, liquid, and packaged (see, e.g., packages 107) form. To simplify hopper loading, the hopper 110 may include an open top as shown. Once treating material 109 is placed into the hopper 110, a cover (not shown) may optionally be used to close the open top to, for example, keep the hopper contents dry.

The discharge outlet 111 is in communication with the hopper 110 and is adapted to disperse or dispense treating material 109 contained therein to the target area 201. To control the volume of material 109 that exits the hopper 110, the gate 126 may be provided. As used herein, "gate" may refer to any device that permits flow of material from the outlet to be stopped and started. For example, the gate could be configured as a simple door that opens and closes under control of the gate actuator 112. Typically, the gate 126 would remain closed during vehicle transport, but be opened (fully or partially) during turf repair operations. As with the other control components of the vehicle 100, the gate 126

(actuator 112) may be in communication with the controller 120 such that, based upon other parameters recognized by the controller, the gate may be opened and closed to provide a volume of treating material 109 to the target area 201.

While shown in FIG. 2 as a divot (enlarged for illustration purposes), the term "target area" may refer to any turf area (or other surface area in non-turf applications) that is damaged or is otherwise distressed as compared to surrounding turf. For example, target areas may include, but are not limited to, dead grass, diseased areas, weeds, divots, ruts, and most any other areas that exhibit conditions that may be conducive to disease (e.g., firing, wilting, necrosis of plant tissue, or other indications of biotic or abiotic stress).

In general, systems in accordance with embodiments of the present disclosure may be able to: detect target areas; characterize the target area (e.g., determine its size); optionally dispense an appropriate volume of treating material into the target area; and optionally smooth the treating material over the target area.

Autonomous identification of target areas may be provided by one or more ground analysis sensors, collectively referred to herein as sensor 128. For example, an image sensor 128-1 may be supported by the chassis (e.g., near a front end of the chassis as shown in FIG. 2). While shown as being part of the vehicle 100, the sensor 128-1 may be remote from the chassis 102, e.g., associated with another ground-based vehicle 300 such as a lawn mower (manually or autonomously operated). Alternatively, the remote sensor 128-1 could be placed at one or more fixed locations, e.g., on poles 302 in and around the work region, or could be attached to an aerial vehicle 304 such as a drone, satellite, fixed- or rotating-wing aircraft, blimp, etc.

The sensor 128-1, which may be in communication (directly or indirectly) with the controller 120, may use data (e.g., image) analysis to identify target areas. For example, the sensor 128-1 may be a camera having appropriate sensors that capture differences in color, contrast, and/or reflectivity between the target area and the surrounding ground surface as it views the work region. That is, as target areas 201 may present as areas of different contrast, color, and/or reflectivity compared to surrounding turf areas, the sensor 128-1, via image/data analysis routines (e.g., performed by the controller 120 or by another controller/processor associated with the sensor including algorithms running on remote computers and servers), may be able to identify target areas and relay corresponding locations to the controller 120.

The sensor 128-1 may be most any spectral (e.g., single- or multi-) reflectance measurement sensor (e.g., a generic digital camera or even a device capable of taking multiple, single point reflectance measurements) adapted to identify or "see" (using data processing techniques), target areas among otherwise healthy areas of turf. For example, a multi-spectral sensor typically includes a multi-channel detector capable of measuring reflected light across one or more bands of the electromagnetic spectrum. As each channel of the detector is limited to detecting reflection only within its specific wavelength band, data (which again may be images or a collection of single point data measurements) may be obtained that capture brightness and color information of the work region, wherein target areas (soil and/or distressed turf) may appear differently. The sensor 128-1 may thus provide data similar to normalized difference vegetation indexes (NDVI). Once again, once the target areas are identified, their coordinates may ultimately be relayed to the controller 120.

Again, while the example above is described as a multi-spectral sensor, a single spectral band sensor may also be utilized without departing from the scope of this disclosure. That is to say, detecting and analyzing reflectance within a single spectral band may be sufficient to identify target areas within a turf surface.

In some embodiments, the sensor 128-1 may be a digital camera that captures images within the 400-700 nanometer (nm) wavelength range. Image capture using infrared or near-infrared detection in the 700-1100 nm wavelength range may also be incorporated, while even longer wavelengths may be used to provide temperature information. In fact, most any wavelength (or range of wavelengths) from ultraviolet to near infrared are contemplated within the scope of this disclosure. Regardless of the specific sensor utilized, embodiments of the present disclosure may capture data (e.g., images) and evaluate those data (using data/imaging processing techniques) based on differences (e.g., color, contrast, reflectivity) to detect target areas. While described as a single sensor, the sensor 128-1 may utilize more than one detector ("stereo" detection) to, for example, also estimate target area size/volume.

In still yet other embodiments, the sensor 128-1 may be configured as a thermal sensor adapted to detect surface temperatures of the work region. As bare soil and drought-stressed turf are typically warmer than surrounding turf due to turf transpiration, thermal sensors may be well-suited for identifying target areas. Similarly, turf generally has different acoustic attenuation characteristics as compared to soil. Accordingly, the sensor 128-1 could alternatively be configured as an acoustic sensor. In yet other embodiments, the sensor 128-1 could be configured as another electromagnetic sensor such as a radio detection and ranging (radar) device. As turf may present different electromagnetic attenuation than soil, radar may also be useful for identification of target areas.

While the sensor 128-1 is described herein as a non-contacting sensor, other embodiments may identify target areas 201 via mechanical interaction with the ground surface 103. For example, as shown in FIG. 2, the vehicle 100 may include a depth sensor 128-2. The depth sensor may include an arm 131 pivotally supported by the chassis 102. A rotating wheel 132 may be supported at a distal end of the arm as shown, wherein the wheel 132 rolls across the ground surface 103 during vehicle movement. As the wheel 132 may follow terrain during operation, it may drop into a divot or recess (e.g., target area 201) when encountered. As the wheel 132 drops, the change in angle of the arm 131 (e.g., relative to the chassis 102) may be detected by the sensor 128-2 and a signal provided to the controller 120, wherein the signal corresponds to a depth of the target area 201. The volume of treating material to be metered to the target area may then be calculated by the controller 120 based upon sensed depth. In some embodiments, several wheels 132 and corresponding arms 131 may be provided transversely across the front of the vehicle 100. By providing such multiple sensors 128-2, a three-dimensional map of the target area 201 may be generated. In other embodiments, depth may be estimated by sensors of other configurations. For example, vertical depth probes or other ground-following devices are contemplated. Still further, laser scanners may be used to estimate target area size and depth.

In addition to sensor-based target area detection, human-generated reports of target areas 201 may also be used. For example, a golfer (or maintenance worker) may identify a divot and, via an application running on a mobile phone or via a text message, send location data of the target area to the remote computer 119, which may subsequently provide the location data to the controller 120 of the vehicle 100. In yet other embodiments, target detection may occur via drone photos or the like.

Once a target area is identified, e.g., via any of the methods and sensors described herein, the geographic location of the target area may be recorded in the memory 124 of the controller 120 for treatment at a later time and the location wirelessly transmitted to the remote computer. Such a configuration may be typical when the detection function is provided by a sensor remote from the vehicle 100 (e.g., when detection occurs via the vehicle 300, the pole-mounted sensor, or an aerial-based sensor). In other embodiments, data may be transmitted (unidirectionally or bi-directionally) via a wired connection (e.g., when the vehicle returns to base and docks as described below), or the vehicle may store data on a storage device that may be removed from the vehicle for subsequent data transfer. In still other embodiments, the vehicle 100 may detect the target area 201 and proceed to immediately treat it. The latter procedure may be typical when using the onboard sensor 128-1 or 128-2 (which may be collectively and individually referred to as sensor(s) 128). Regardless of whether the treatment occurs immediately after identification, the controller 120/sensor 128 may be adapted to not only record the coordinates of the identified target area, but also to wireless transmit data or status information regarding this and other aspects of the treatment to the remote computer 119 (e.g., golf course central computer, cellular phone, internet site, remote server, etc.). The status information may include various data in addition to the coordinates of the areas treated. For example, data regarding the volume of treating material used could also be contained within the information sent, as well as the date and time material was dispensed to the target area.

FIG. 2 further illustrates a hopper and material delivery system in accordance with embodiments of the present disclosure. As stated elsewhere herein, the hopper 110 may be in fluid communication with a discharge chute 113 forming a discharge outlet 111 that may selectively direct the treating material 109 contained in the hopper to the target area 201. To control the volume of treating material dispersed or delivered in and around the target area, the gate 126 may be selectively opened (moved from a closed position to a fully or partially open position), under control of the controller 120, via the actuator 112. For example, the gate could be opened for a fixed period of time that is calculated, based upon various parameters of the treating material and the chute 113, to adequately fill the target area 201. Once the treating material is dispersed, the gate 126 may be closed, again under control of the controller 120.

Accordingly, once the location of the target area 201 is identified (using the sensors described above), the vehicle (e.g., chassis 102) may be positioned (e.g., autonomously or semi-autonomously) at a location proximate the target area such that the discharge outlet 111 is capable of delivering the treating material 109 to the target area. That is to say, the discharge outlet 111 of the container may be positioned, under control of the controller 120, relative to (above) the target area. In some embodiments, the chute 113 may be fixed, while in other embodiments the chute is movable (e.g., rotatable), under control of the controller 120, relative to the chassis 102, to permit subsequent repositioning of the chute without requiring movement of the vehicle. Such chute movement may also occur during dispensing of the treating material 109 to accommodate coverage of larger areas, again without requiring movement of the vehicle 100. While shown herein as a simple chute 113, the outlet may be configured in most any suitable manner, e.g., as one or more seeder tubes, conveyor belts (see, e.g., FIG. 4), etc.

While illustrated as being located beneath the vehicle 100, the chute 113 could be configured in a manner similar to a conventional vehicle-based concrete mixer. That is the chute 113 could be located on a side (front, back, left, right) of the vehicle 100 and may translate or swing to permit distribution of the treating material to a range of locations proximate the vehicle 100. This again would permit the vehicle to locate proximate the target area, after which the chute may be precisely positioned over the target area without requiring excessive vehicle movement.

The actuator 112 may form part of a metering system that can be modulated by the controller 120 to meter (via the gate 126) the appropriate volume of treating material 109 through the outlet 111 to the target area 201. For example, the system may monitor the volume of treating material in the hopper 110 in real-time such that the rate and volume of material released is known by the controller 120. In the embodiment illustrated in FIG. 2, this monitoring may occur with a load cell 134 that monitors a weight of the hopper 110. As treating material is released from the hopper, the load cell may indicate a corresponding reduction in hopper weight, which may be correlated (by known density of the material) to a volume of the treating material released.

Figure 3:
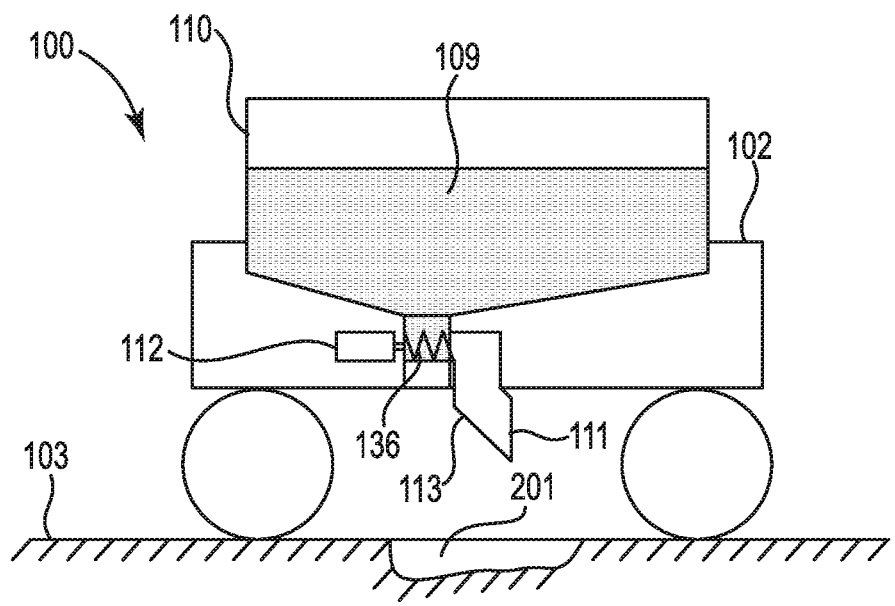
FIG. 3 illustrates a turf repair vehicle in accordance with another embodiment of the present disclosure.

In other embodiments, the gate 126 could be configured as an auger 136 as shown in FIG. 3, wherein the actuator 112 could be an electric motor. When the motor is energized, the auger 136 may rotate and deliver a known amount of material for each auger rotation. While shown as being oriented horizontally, the auger 136 could also be oriented vertically, or in most any other orientation, without departing from the scope of this disclosure. When the gate is configured as an auger, the term "open" or variations thereof may be used to refer to rotation of the auger, while the term "closed" or variations thereof may be used to refer to non-rotation of the auger.

The auger 136 may be advantageous for some materials and environmental conditions. For instance, where the treating material 109 particles tend to clump together (e.g., in humid or wet conditions), the auger 136 may assist in breaking up those clumps before dispensing material to the target area 201. The auger 136 may also cause some vibrations that may assist with drawing the treating material 109 toward the auger. While not illustrated herein, the hopper 110 could include separate vibrating elements that assist in loosening treating material 109 that may otherwise stick to the walls of the hopper.

Figure 4:
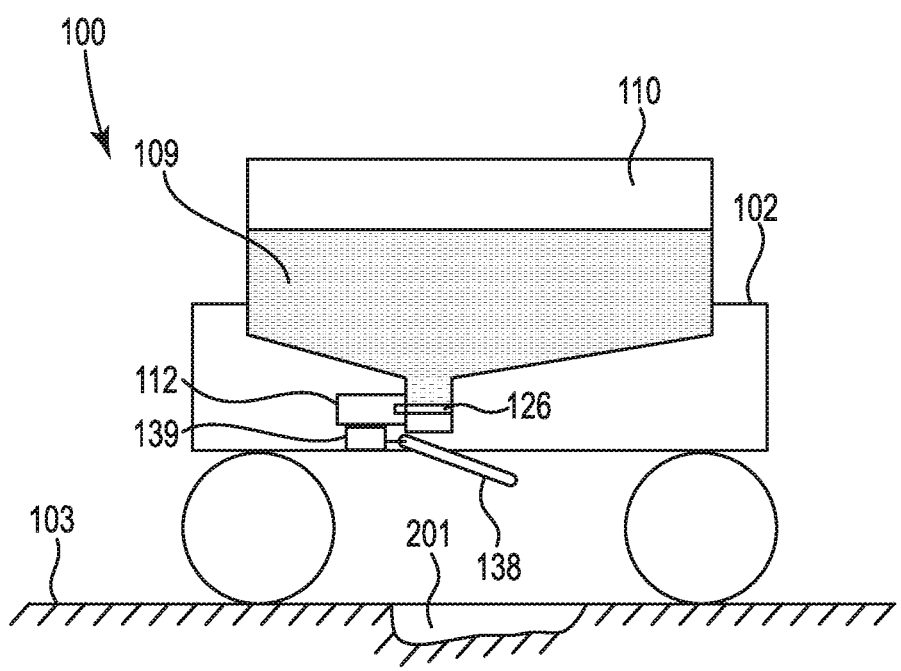
FIG. 4 illustrates a turf repair vehicle in accordance with yet another embodiment of the present disclosure.

FIG. 4 illustrates yet another metering system wherein treating material 109 is released again by a mechanical gate 126 similar to the gate shown in FIG. 2. However, instead of directing the material through a chute directly to the target area 201, the gate 126 may time or otherwise measure the release of material onto a conveyor belt 138 powered by a motor 139 (similar to some commercial top dressers) in communication with the controller 120 (controller not shown in FIG. 4). As with the chute 113, the belt 138 may be moved, e.g., pivoted up and down and/or rotated side-to-side, to assist with controlling delivery of the treating material.

Regardless of the metering system utilized, embodiments of the present disclosure may base the metered amount of treating material 109 delivered through the discharge outlet to the target area 201 on either one or more standardized or fixed volumes (e.g., volumes A, B, C, etc.) of treating material. Alternatively, one or more sensors (e.g., image/thermal/acoustic sensors 128-1 and/or depth sensor 128-2)

may be used to calculate or estimate (with the controller) a required volume to level/treat the target area 201 (e.g., deliver a volume of treating material 109 necessary to completely fill (or slightly overfill) an estimated volume of an identified divot based upon one or more dimensions of the target area). The gate may thus meter the material based upon one or both of: time; and a position of the discharge outlet 111. In some embodiments, the system may provide a base volume of treating material (e.g., 240 cubic centimeters (cc)) and may, based upon an estimated volume of the target area, provide a multiple (e.g., 1, 2, or 3 times) of the base volume to treat the area.

The terms "outlet," "chute," and "gate" are used herein in a broad sense to indicate most any mechanism that permits controlled transfer of treating material 109 from the hopper 110 to the target area 201. For instance, mechanical arms, blowers, sprayers, conveyors, spinners, and the like may collectively perform the functions of, and thus operate as, the outlet, chute, and gate without departing from the scope of this disclosure.

Figure 5:
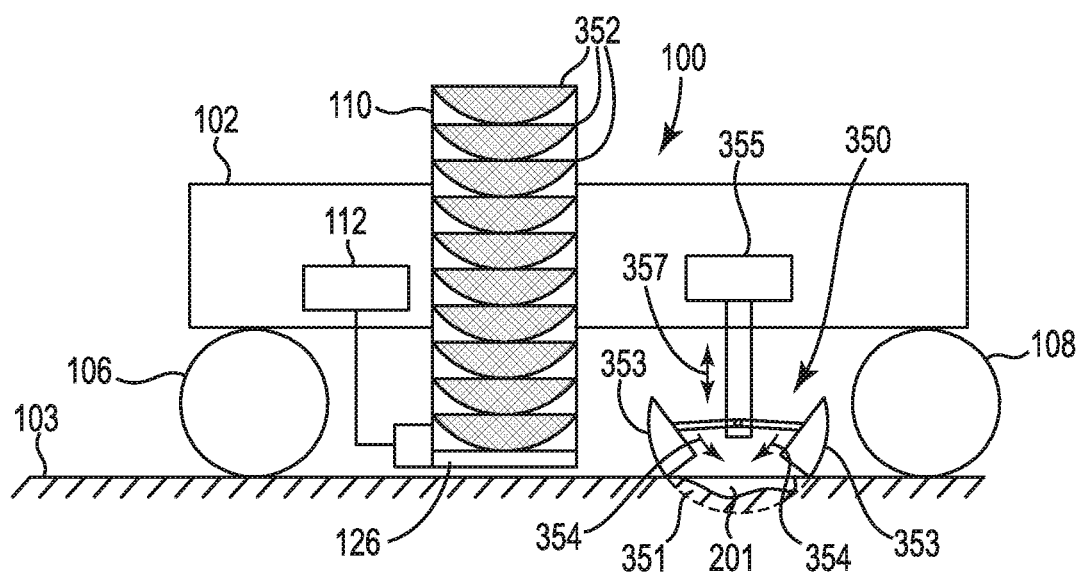
FIG. 5 illustrates a turf repair vehicle in accordance with still another embodiment of the present disclosure.

In alternative embodiments, the vehicle 100 may include a cutter or core tool 350 as shown in FIG. 5. The tool 350 may be adapted to remove or excise from the turf surface a predetermined portion of turf around the target area (e.g., a clean margin thereabout), leaving a standard size recess 351 in the turf surface. A standard volume of treating material may then be dispersed to the target area. In some embodiments, instead of then delivering a volume of granular or liquid treating material 109 to the exposed recess 351, the treating material carried in a modified hopper 110 may instead be pre-formed "plugs" 352 of sod of a corresponding size that may then be set within the newly-created recess 351 in the ground surface 103. In some embodiments, the tool 350 may be adapted to move vertically up and down (directions 357) to permit placement of the tool relative to the target area 201.

The tool could include two opposing shovel jaws 353 that may, under control of the controller 120 (not shown in FIG. 5) be pivoted toward one another as indicated by the arrows 354. One or more motors 355 (also under the control of the controller 120) may control both the elevation of the tool 350 as well as the opening and closing of the jaws 353. Accordingly, upon identifying a target area 201, the vehicle may first excise the turf surrounding the target area, after which the vehicle may locate the gate 126 directly over the recess 351. Upon actuation of the actuator 112, the gate 126 may open, allowing the plug 352 to be set within the recess 351. The removed material may be stored in a separate onboard hopper (not shown) or ejected to the ground surface 103 where it may ultimately break down. The vehicle may include cutter tools and plugs of one or more sizes to permit treatment of various target area sizes. As described elsewhere herein, when such plugs are laid, the vehicle may log the location and time/date of repair and relay such information to an irrigation controller to ensure adequate watering occurs thereafter.

With reference again to FIG. 2, the treating material (e.g., particulate or liquid material) could be placed into the hopper in packages 107. The packages may form a porous membrane or, when holding solids, be water-soluble such that each package, after delivery to the target area 201, may breakdown or otherwise release its contents. Alternatively, the hopper 110 may include a slicer 140 or similar device. The illustrated slicer 140 may rotate (e.g., via a motor (not shown)) during operation, whereby teeth of the slicer are adapted to slice or tear the packages before or during dispersal/delivery to the target area. In still other embodiments, the packages may be delivered intact to the target area, and then ruptured by a reciprocating spike or other tool (not shown) attached to the vehicle 100. The term "slicer" may be used herein to describe any device or process (mechanical or otherwise) adapted to open the packages 107.

After depositing the treating material 109 to the target area 201, the vehicle 100 may distribute or smooth the treating material dispersed in and around the target area using a grooming tool attached or otherwise connected to the chassis 102. For example, the vehicle 100 may manipulate, e.g., tow, a grooming tool 142 (see FIG. 2) that includes one or more of a brush, a blade, a squeegee, a drag mat, a roller, a rake, an air jet, a water jet, a mechanical abrader (such as that shown in U.S. Pat. No. 10,058,087), and a tamper. The grooming tool 142 may be manipulated to assist with evenly spreading and smoothing the treating material 109 dispersed in and around the target area, and to level the target area 201 to the same elevation as the surrounding turf. In some embodiments, the vehicle 100 may further include a probe assembly, such as that described in WO2018/132650, to determine the profile of an infill material after the material is dispensed to the target area 201 and smoothed.

In other embodiments, the grooming tool may be excluded. In this instance, subsequently irrigation or movement of other vehicles (e.g., mower) may eventually distribute the treating material effectively. In other embodiments, the vehicle 100 may utilize the grooming tool 142 to mitigate interference of debris resulting from damaged or treated turf. For instance, the vehicle may include a sweeper or brush that collects debris (aerator cores, divot material, etc.) and stores the debris in an onboard container that may be emptied at a later date using, for example, a debris sweeper similar to that described in U.S. Pat. No. 7,716,773. Alternatively, the debris may be collected and then pulverized onboard the vehicle utilizing a processor like that described in U.S. Pat. No. 8,205,681, whereinafter the pulverized debris is distributed over the ground surface 103.

As stated herein above, after the vehicle 100 has completed dispersing treating material in and around a target area 201, the time and/or date of the application, and the coordinates of the treated area, may be recorded (e.g., within the memory of the controller 120 and/or transmitted to the remote computer 119). Recording the location of the target area may be beneficial to avoid unnecessary re-treatment of the same target area at a later date. Moreover, recording the location may also permit onboard or remote sensors 128-1 and 128-2 to monitor the progress of the treated area over time, and/or to check for washout of the infill material at a later date. Still further, recording the location of a treated area and transmitting that location to the remote computer 119 (see FIG. 6) may allow the remote computer to communicate with an irrigation controller 144 to operate the irrigation zone encompassing the treated area using a planting irrigation cycle. A planting irrigation cycle may deliver less water than a normal irrigation cycle to reduce the opportunity for washout of the infill/treating material 109, and/or to keep the target area damp to facilitate seed germination.

Figure 6:
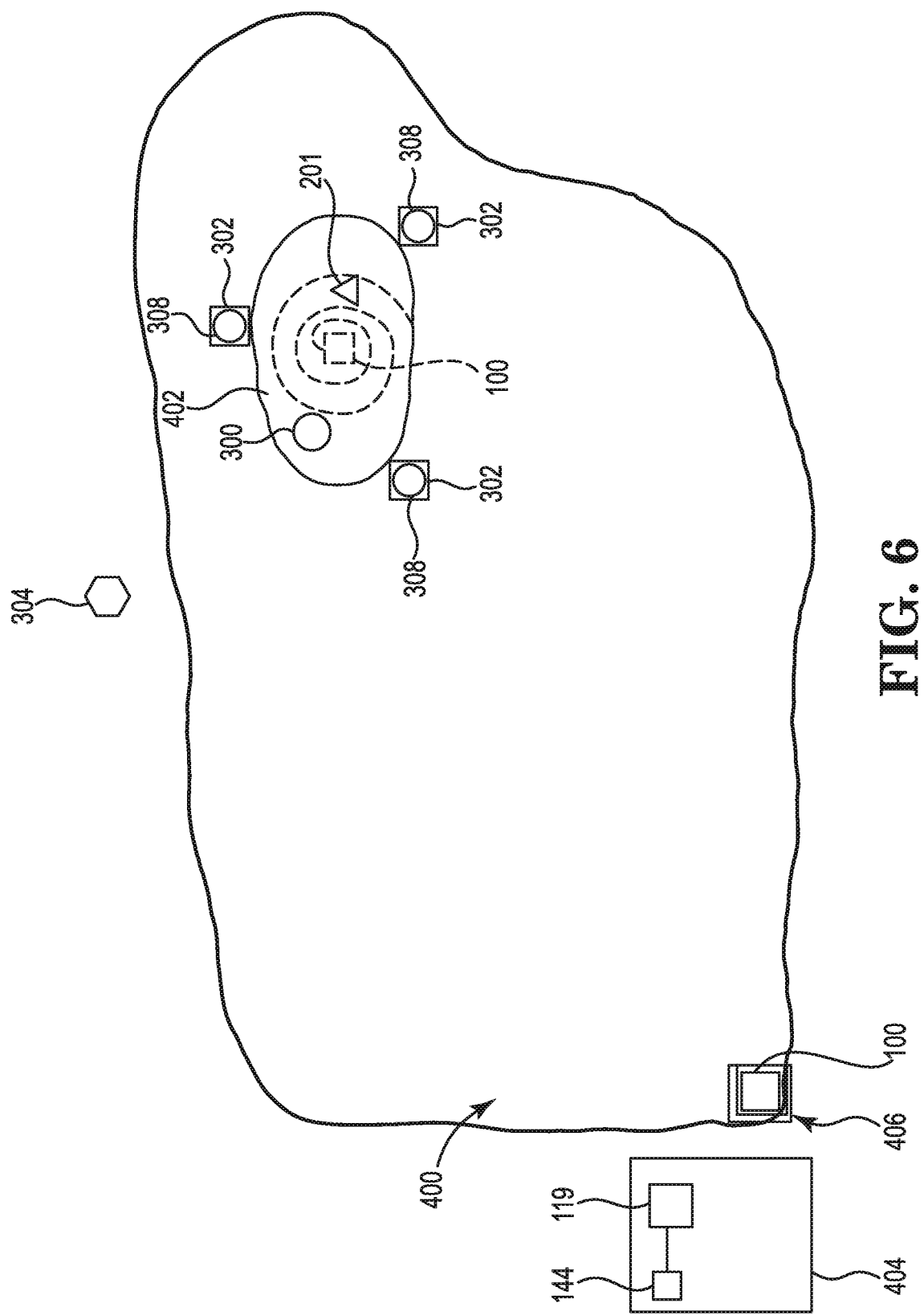
FIG. 6 illustrates an exemplary turf repair system using any one of the vehicles shown in FIGS. 1-5.

FIG. 6 illustrates a portion of an exemplary property 400, e.g., a portion of a golf course. The course may include various turf surfaces such as fairways, roughs, and teeing areas, the latter of which is illustrated in FIG. 6 as tee area 402. For purposes of this example, the teeing area 402 is a designated work region. However, other sub-areas, or even the entire golf course, could be designated work regions as long as the region includes a turf surface. In fact, due to the confined space and ability to visually evaluate the area, tee areas may be more easily dealt with using conventional divot repair processes. However, the exemplary processes used to identify, characterize, and treat (disperse and smooth treating material) may be generally the same regardless of the specific area being treated.

The course may include an equipment or utility building 404, which may house various turf care equipment and course management systems. For example, the building may house the remote computer 119 that controls various course systems including an irrigation system controlled by an irrigation controller 144. While shown as being housed in a building adjacent to the course, the remote computer could be located at most any remote site as long as such remote site is able to communicate with the various course management systems (e.g., via the internet).

The vehicle 100 may be stored at a base station 406. The base station may permit not only storage and re-charging of the vehicle's battery (see battery 114 in FIG. 1), but also store and replenish the treating material 109 as further described below.

After establishing the work region, the vehicle may be dispatched or otherwise transported to the work region 402 to conduct regular turf evaluations (using onboard sensors 128-1, 128-2). In addition or alternatively, the vehicle 100 may be dispatched after receiving coordinates of target areas from remote sensors (e.g., associated with aerial vehicles 304, other ground vehicles 300, or fixed locations (e.g., sensors attached to posts 302 located in and around the work region 402)) or from reports from golfers or maintenance personnel.

The vehicle 100 may move from the base station 406 to the work region 402 either autonomously or via operator-assisted propulsion. Again, while the work region 402 is defined in this example as a golf course teeing area, the work region could be most any portion of the course (e.g., tee, fairway, rough, or green). Moreover, most any method may be used to establish the work region. For example, the work region could be established by providing the controller 120 with a geographic location of the boundary of the work region by, for example: pre-programming of the boundary; learning the boundary during a training phase; receiving information from another vehicle (e.g., vehicles 300 and 304; see FIG. 2); receiving boundary information from a beacon 308 (e.g., attached to posts 302) or the like); receiving boundary information from the remote computer 119; identifying player stopping locations; and receiving information from player reports (e.g., via text messages or a mobile phone application).

Once within the work region 402, the vehicle 100 may operate autonomously across the work region under control of the controller 120 to either: move directly to a known target area 201 location; or begin searching for target areas by moving in a planned, random, or semi-random pattern. For example, the vehicle could move to an initial location (e.g., geometric center) of the work region and then move outwardly in a spiral pattern (see dashed lines in FIG. 6) until the entire work region is covered. In this sense, the work region could be viewed as an electronic "tether" defining a radius from a starting point. In such an embodiment, the "center" of the work region could be defined by a beacon (permanent or temporary), or could otherwise be known by its coordinates.

Once the target areas are identified and treated as described above, the vehicle 100 may be transported back to the base station 406. Again, transport may occur under either autonomous, semi-autonomous, or operator-assisted control.

Figure 7:
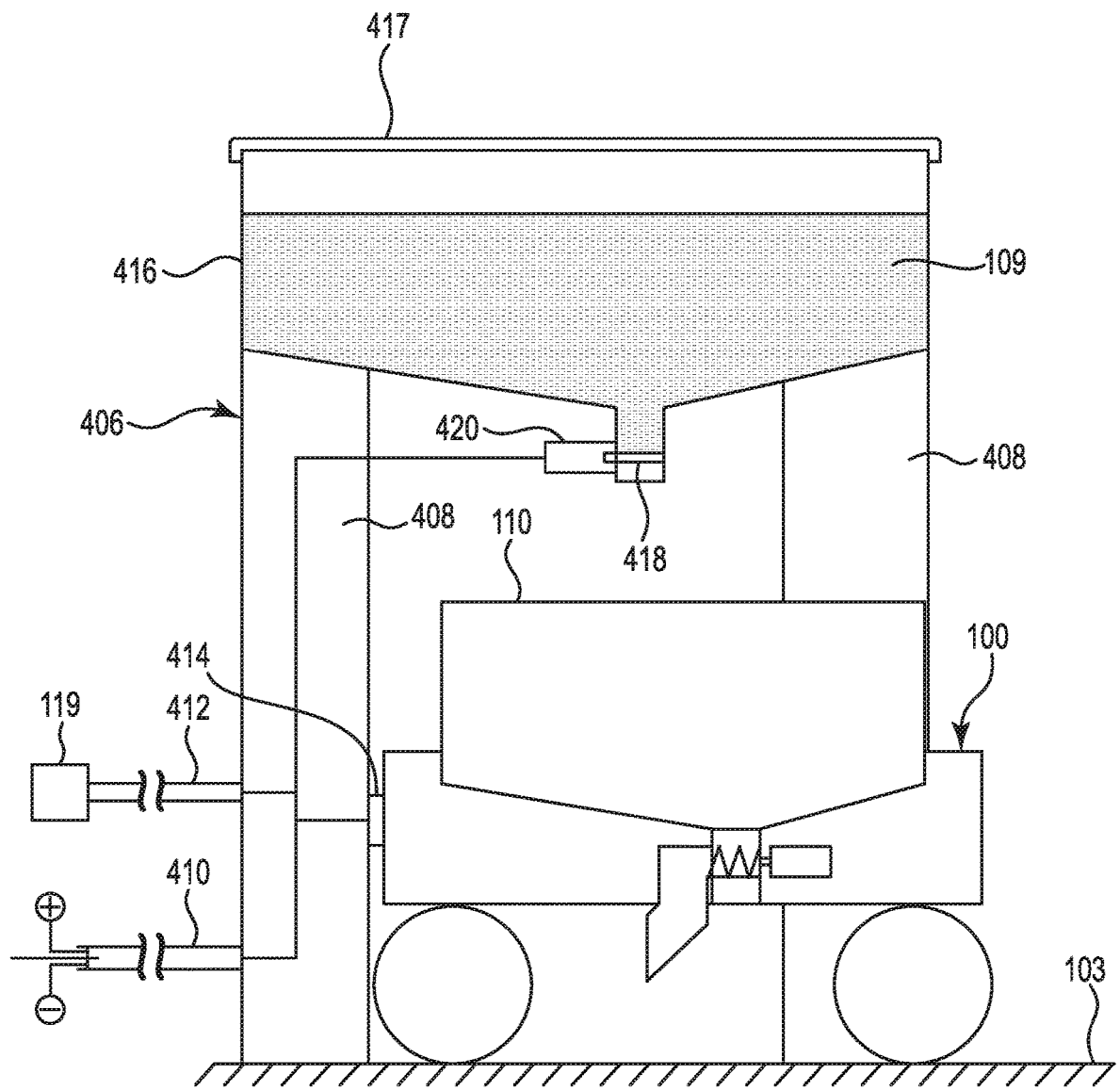
FIG. 7 is a diagrammatic view of a base station in accordance with embodiments of the present disclosure, the base station forming part of the turf repair system of FIG. 6.

FIG. 7 schematically illustrates a base station 406 in accordance with embodiments of the present disclosure. For autonomous return to the base station, the vehicle 100 may transport back to known coordinates and then use a beacon on the base station or machine vision techniques to dock with the base station as shown in FIG. 7.

The base station may include a frame 408 near which the vehicle 100 may position itself when docked. The frame may also have connected thereto a power connection 410 and optionally a wired or wireless data connection 412. The power connection 410 may deliver electrical power to contacts 414. The vehicle 100 may include corresponding contacts such that, when the vehicle 100 is docked, the battery 114 (see FIG. 1) may be recharged via the power connection. The data connection 412 may optionally be provided to allow remote access to the memory 124 of the controller 120, and to provide status of the vehicle 100 and base station 406, e.g., to the remote computer 119.

In some embodiments, the frame 408 of the base station 406 may support a material hopper 416 having an option lid 417 as shown. The material hopper 416 may contain a volume of treating material 109 that may be used to replenish the hopper 110 of the vehicle 100. To control transfer of treating material 109 from the material hopper 416, a gate 418 and gate actuator 420 may be provided and operated similar to the gate 126 and actuator 112, respectively, described above. That is to say, the controller 120 and/or remote computer 119 may energize the actuator 420 to open the gate 418 once the vehicle 100 is docked.

In order to automatically ensure the appropriate volume of treating material 109 is transferred from the material hopper 416 to the vehicle hopper 110, various sensors may be used. For example, the load cell 134 (see FIG. 2) may continuously indicate to the controller 120 and/or directly to the remote computer 119 (e.g., via the data connection 412) the volume of treating material in the hopper 110. Once the load cell provides a signal corresponding to the presence of the desired volume of treating material 109, the gate 418 may be closed. In other embodiments, other sensors (e.g., cameras, flow-based sensors) may be used to detect the volume of material transferred to the hopper 110, while in still other embodiments, hopper 110 replenishment may be accomplished manually.

Figure 8:
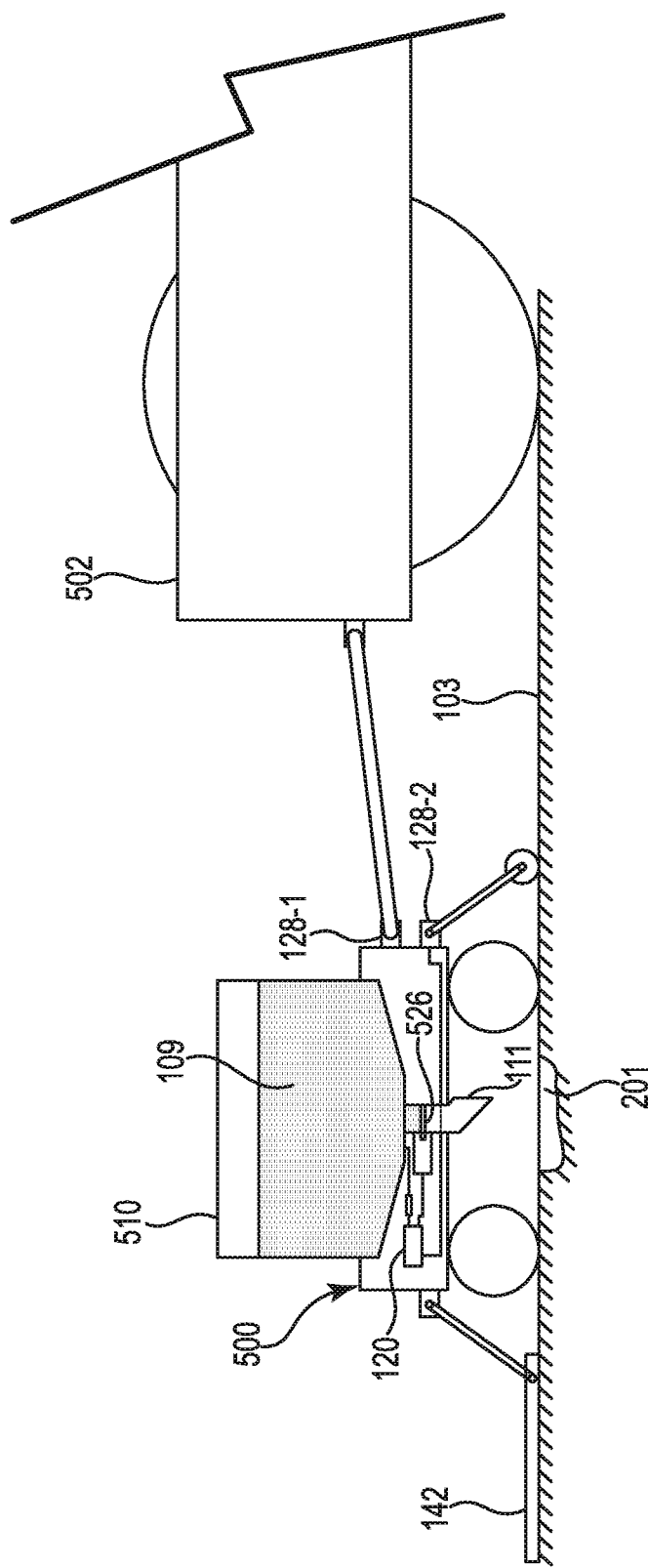
FIG. 8 illustrates a ground surface treatment vehicle in accordance with another embodiment of this disclosure, the vehicle configured as a turf repair implement towed behind a grounds maintenance vehicle (e.g., utility vehicle)

While described herein above as a self-contained, autonomously or semi-autonomously guided vehicle 100, other configurations are certainly possible. For instance, FIG. 8 diagrammatically illustrates an autonomous ground maintenance system having a towed implement 500 pulled behind an operator-controlled maintenance vehicle such as a maintenance vehicle or tractor 502. In such a configuration, the tractor 502 may transport the implement 500 over the turf surface 103, negating the need for autonomous self-propulsion of the implement 500. However, the implement 500 may be similar in most other respects to embodiments of the vehicle 100 described herein. For example, the implement 500 may include sensors 128-1, 128-2 (onboard or remote) to identify target areas 201, and may further include a hopper 510 and gate 526, the gate being autonomously controlled (by the controller 120) to autonomously distribute treating material 109 from the hopper 510 to identified target areas 201 in a manner already described herein. Such a towed configuration (with autonomous treatment capabilities) may provide various benefits including, for example: elimination or simplification of some or all of the autonomous navigation and propulsion systems; accommodation of a greater volume of treating material (and/or permitting refilling of treating material from a hopper (not shown) on the tractor 502 via one or more dispensing outlets); and the ability to pull a heavier grooming tool 142.

Systems and methods in accordance with embodiments of the present disclosure may further utilize a transport vehicle that may carry one or more (e.g., a plurality) of the vehicles 100 onboard and deliver and retrieve the vehicles 100 from various (e.g., first and second) work regions. For instance, FIGS. 9-12 illustrate a transport vehicle 600 that includes provisions for carrying one or more (e.g., a plurality of) vehicles 100 (vehicles 100 not shown in these views). While shown as a riding vehicle 600, other embodiments may provide a remote-controlled or autonomously-controlled vehicle.

In some embodiments, the transport vehicle 600 may be a modified version of the model Workman HD utility vehicle sold by The Toro Company of Minneapolis, Minn. USA. The vehicle 600 may include an operator station 602 to accommodate a sitting operator (and, optionally, one or more passengers). The operator station 602 may include one or more controls (e.g., steering wheel, speed control, brake control, etc.) that permit the operator to control movement and operation of the vehicle 600 over the ground surface 103. The vehicle 600 may be supported upon the ground surface by wheels, 606, 608 (only left side wheels visible, with right side wheels being generally mirror-images of their left side counterparts). One or more of the wheels (e.g., rear wheels 606) may be powered to propel the vehicle during operation, while the same or other wheels (e.g., front wheels 608) may be conventionally steerable (other steering geometries, e.g., differentially driven drive wheels, are also contemplated). The vehicle 600 may include a prime mover 604 (e.g., internal combustion engine or energy storage device (e.g., battery) as shown in FIG. 10) to power not only the drive wheels but other systems associated with the vehicle 600.

Figure 9:
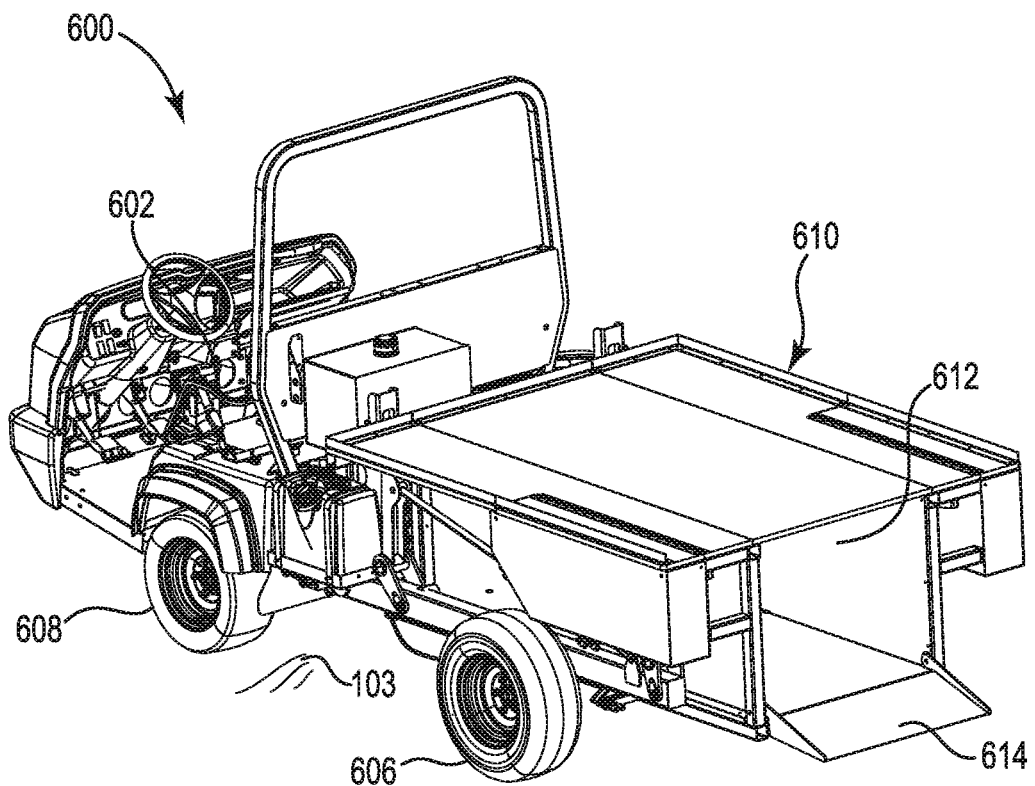
FIG. 9 is a rear perspective view of an exemplary transport vehicle for transporting one or more autonomous ground surface treatment vehicles, the transport vehicle shown with a bed in a transport position.
Figure 10:
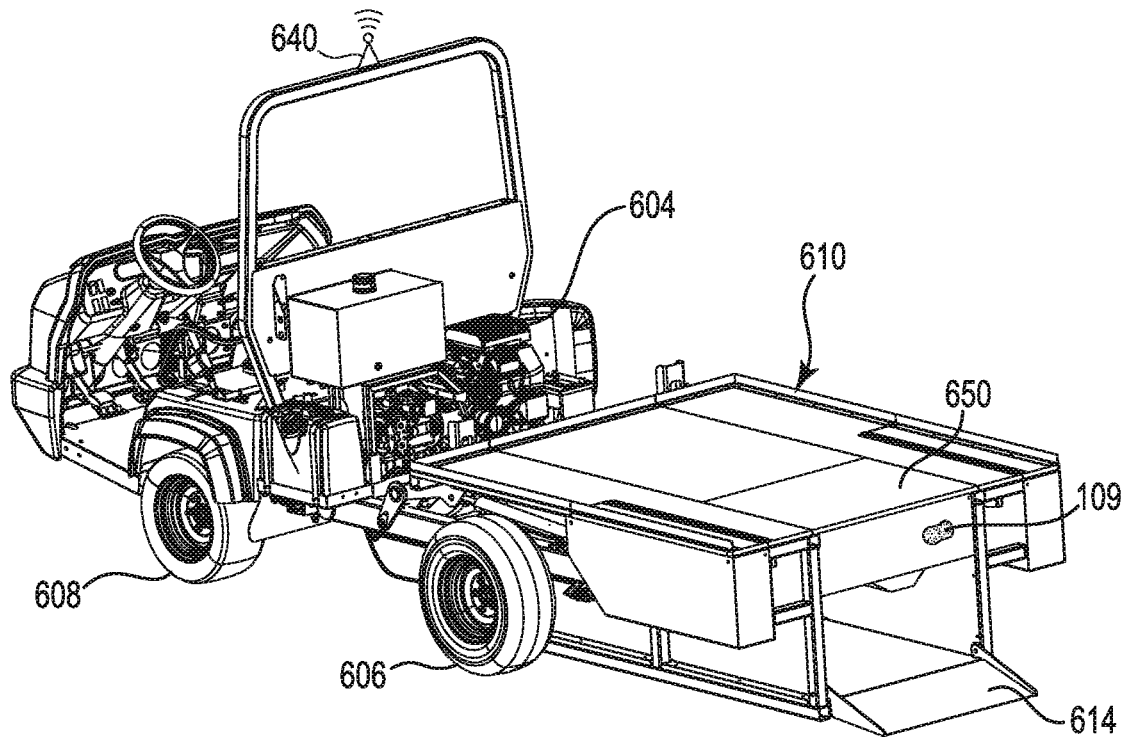
FIG. 10 is a rear perspective view of the exemplary transport vehicle of FIG. 9 with the bed shown in deployment position.
Figure 11:
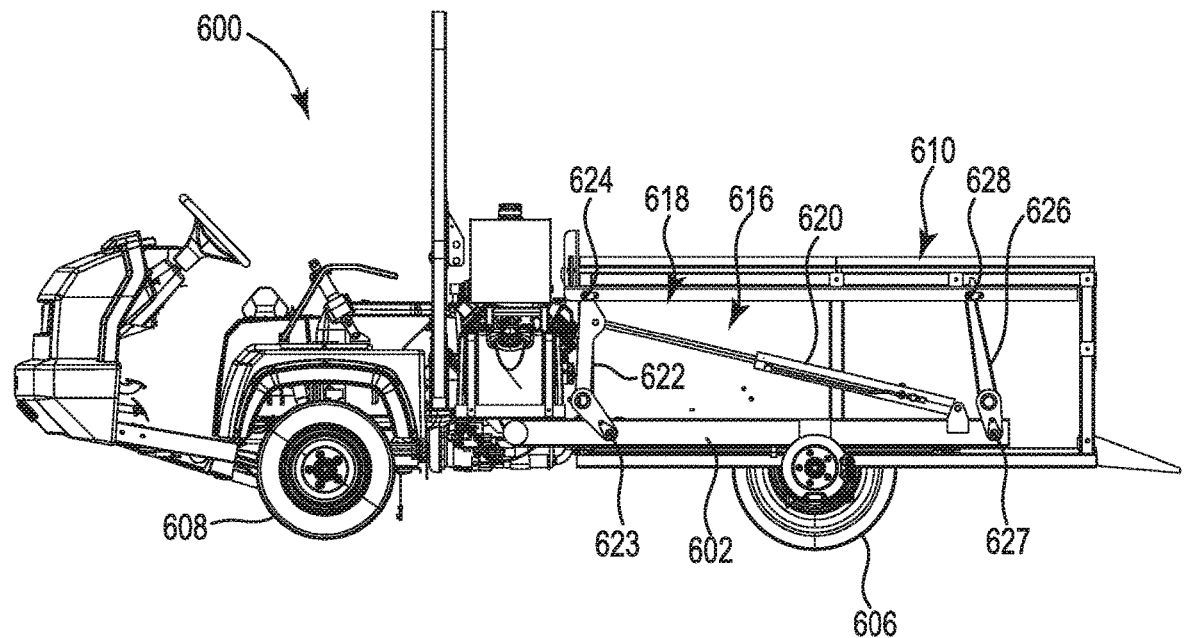
FIG. 11 is a side elevation view of the transport vehicle of FIG. 9 (e.g., with the bed in the transport position)
Figure 12:
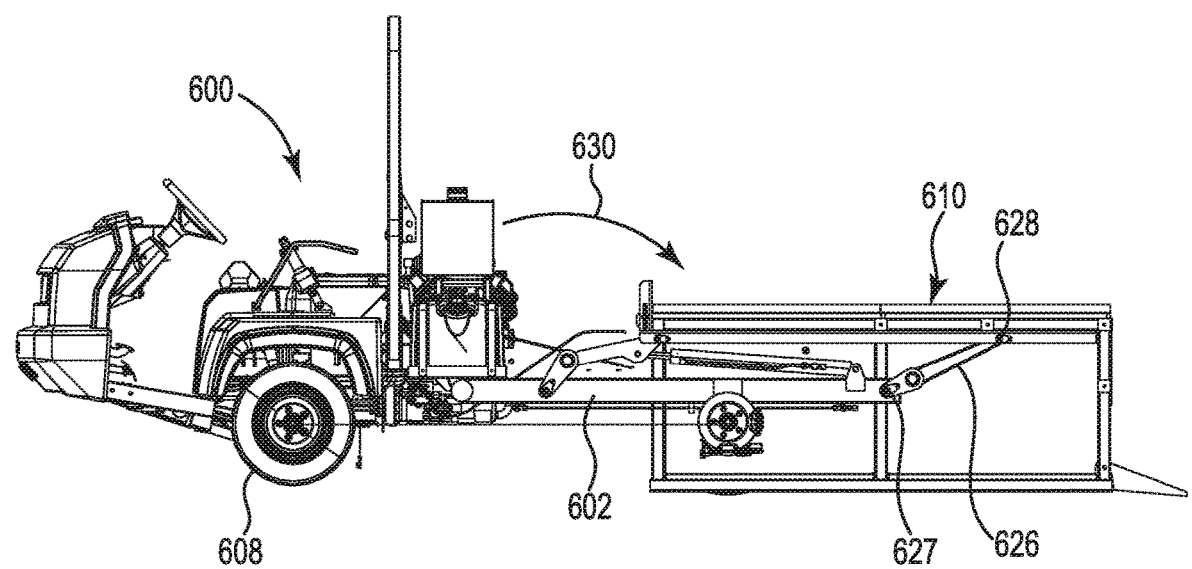
FIG. 12 is a side elevation view of the transport vehicle of FIG. 10 (e.g., with the bed in the deployment position).

As shown in FIGS. 9 and 10, the vehicle may also include a bed 610 defining a space 612 operable to receive and support therein one or more of the vehicles 100. The bed 610 may, in some embodiments, be movable between a transport position as shown in FIGS. 9 and 11, and a deployment position as shown in FIGS. 10 and 12. In the transport position, the vehicle 600 may be suited to transporting the carried vehicle(s) 100 between multiple locations. Upon reaching a desired vehicle deployment location, however, the bed 610 may be placed in the deployment position, wherein vehicle(s) 100 carried thereon may exit the bed and begin autonomous operation as described elsewhere herein. The bed 610 may include a ramp 614 (either fixed or movable to a ramp position) that assists with vehicle 100 deployment.

While not wishing to be bound to any particular embodiment, FIGS. 11-12 (various vehicle 600 structure removed in these views for clarity) illustrate an exemplary bed movement system 616 adapted to move the bed 610 from the transport position (FIG. 11) to the deployment position (FIG. 12). In this embodiment, each side of the bed 610 is connected to a frame 602 of the vehicle 600 by two links to form a four-bar linkage 618 (only left side linkage is shown, but right side is a mirror image). Each side further includes an operator-controlled hydraulic cylinder 620 having a cylinder end connected to the frame 602 and a rod end connected to a forward link 622 of the four-bar linkage 618.

The forward link 622 may be configured in a dog-leg shape that pivotally attaches to the frame 602 at a frame pivot 623 and to the bed 610 at a bed pivot 624. Each four-bar linkage 618 further includes a rear link 626 pivotally connected to the frame 602 at a frame pivot 627 and to the bed 610 at a bed pivot 628. As each of the cylinders 620 retract from the position shown in FIG. 11 to the position shown in FIG. 12, the bed may move through an arc 630 defined by the links 622 and 626. The links are designed to maintain the floor of the bed level throughout its range of motion. Moreover, the links 622, 626 are designed to travel over center when returning to the position shown in FIG. 11. As a result, positional placement of the bed in the transport position is not dependent upon maintaining hydraulic pressure to the cylinders 620.

In operation, the transport vehicle 600 may be propelled (e.g., autonomously, semi-autonomously, or under direct or remote operator control) to haul vehicle(s) 100 among one or more work regions. For example, the transport vehicle may be propelled from a first location to a second location, wherein the second location is in or proximate a first work region. Upon reaching the second location, the transport vehicle 600 may deliver one or more of the vehicles 100 from the bed 610 to the first work region, after which the vehicle 100 may operate, e.g., autonomously, as described herein. The transport vehicle may then move to other work regions and deploy other vehicles 100.

When a particular vehicle 100 has completed coverage of a work region (e.g., the first work region) or requires replenishment of its treating material hopper 110, it may communicate status information to (an/or receive status information from) the transport vehicle 600 (e.g., using a radio 640 on the vehicle 600 as shown only in FIG. 10). Such status information may include, but not be limited to, requesting: pick up; to have its treating material hopper 110 refilled with treating material 109 from a hopper 650 (see also FIG. 10) located on the transport vehicle; and/or to have its battery recharged or replaced via facilities also provided on the vehicle 600.

Once the vehicle 100 has completed its work, the transport vehicle 600 may retrieve and then re-deploy the vehicle 100 to another work region or return the vehicle(s) to a home or base location.

While described herein as autonomously detecting and treating target areas, other embodiments may allow an operator to manually distribute treating material via remote control. In such a configuration, target areas could be observed directly by the operator, or could be remotely observed using cameras located upon the vehicle 100.

Various illustrative embodiments are within the scope of this disclosure, some examples of which are identified below.

Embodiment 1. An autonomous ground maintenance system comprising: a vehicle comprising a chassis supported upon a ground surface by ground support members; a container supported by the chassis, the container defining a discharge outlet operable to disperse treating material held within the container to a target area of the ground surface; a gate adapted to selectively open and close the discharge outlet; a sensor adapted to identify the target area; and an electronic controller supported by the chassis, the controller in communication with the sensor and the gate.

Embodiment 2. The system according to Embodiment 1, wherein the controller is adapted to: position the chassis at a location proximate the target area such that the discharge outlet is capable of delivering the treating material to the target area; and energize the gate to open the discharge outlet.

Embodiment 3. The system according to any one of Embodiments 1-2, further comprising a grooming tool connected to the chassis and adapted to distribute the treating material in and around the target area.

Embodiment 4. The system according to any one of Embodiments 1-3, wherein the sensor comprises an image sensor adapted to identify a difference in contrast, color, or reflectivity between the target area and the surrounding ground surface.

Embodiment 5. The system according to any one of Embodiments 1-3, wherein the sensor comprises a depth sensor.

Embodiment 6. The system according to any one of Embodiments 1-3, wherein the sensor comprises either a thermal sensor or an acoustic sensor.

Embodiment 7. The system according to any one of Embodiments 1-3, wherein the sensor comprises a radio detection and ranging device.

Embodiment 8. The system according to any one of Embodiments 1-3, wherein the sensor comprises a spectral reflectance measurement sensor.

Embodiment 9. The system according to any one of Embodiments 1-8, wherein the discharge outlet is movable, relative to the chassis, under control of the controller.

Embodiment 10. The system according to any one of Embodiments 1-9, wherein the sensor is remote from the chassis.

Embodiment 11. The system according to any one of Embodiments 1-10, wherein the treating material comprises at least one of infill, seed, particulate matter, and liquid.

Embodiment 12. The system according to any one of Embodiments 1-11, wherein the treating material is contained in a plurality of packages.

Embodiment 13. The system according to Embodiment 12, wherein the system further comprises a slicer adapted to slice the packages before or during dispersal of the treating material to the target area.

Embodiment 14. A method of operating an autonomous turf maintenance vehicle, the method comprising: establishing a work region in which the vehicle will operate, the work region comprising a turf surface; and transporting the vehicle to the work region. The vehicle comprises: a chassis supported upon the turf surface by ground support members, wherein one or more of the ground support members comprises a drive member adapted to propel and steer the vehicle over the turf surface; one or more motors adapted to power the drive member; a container supported by the chassis, the container comprising a discharge outlet operable to transfer treating material held within the container to a target area of the turf surface; a sensor adapted to identify the target area; and an electronic controller supported by the chassis, the controller in communication with the sensor and the one or more motors. The method further includes: autonomously propelling the vehicle across the work region; and autonomously identifying, with the sensor, the target area.

Embodiment 15. The method according to Embodiment 14, further comprising recording a location of the target area within a memory of the controller.

Embodiment 16. The method according to any one of Embodiments 14-15, further comprising transmitting data regarding a location of the target area to a remote computer.

Embodiment 17. The method according to any one of Embodiments 14-16, further comprising: positioning, under control of the controller, the discharge outlet of the container relative to the target area; selectively opening, under control of the controller, a gate associated with the discharge outlet to disperse the treating material in and around the target area; and closing, under control of the controller, the gate.

Embodiment 18. The method according to any one of Embodiments 14-17, wherein the vehicle further comprises a grooming tool, and wherein the method further comprises manipulating the grooming tool with the vehicle to smooth the treating material dispersed in and around the target area.

Embodiment 19. The method according to Embodiment 18, wherein the grooming tool comprises a tool selected from a brush, a blade, a squeegee, a drag mat, a roller, a rake, an air jet, a water jet, a mechanical abrader, and a tamper.

Embodiment 20. The method according to any one of Embodiments 14-19, further comprising recording a time and date at which the treating material was dispersed in and around the target area.

Embodiment 21. The method according to any one of Embodiments 14-20, further comprising metering the treating material dispersed through the discharge outlet.

Embodiment 22. The method according to Embodiment 21, wherein metering the treating material dispersed through the discharge outlet comprises metering the treating material based upon one or both of: time; and a position of the discharge outlet.

Embodiment 23. The method according to Embodiment 21, wherein metering the treating material through the discharge outlet comprises metering a fixed volume of the treating material.

Embodiment 24. The method according to Embodiment 21, wherein metering the treating material through the discharge outlet comprises metering a volume of treating material, the volume estimated by the controller to fill the target area based upon a dimension of the target area.

Embodiment 25. The method according to Embodiment 21, further comprising measuring a depth of the target area with a depth sensor and calculating, with the controller, a volume of treating material to be metered to the target area.

Embodiment 26. The method according to any one of Embodiments 14-25, further comprising removing from the turf surface a predetermined portion of turf around the target area before dispersing the treating material in and around the target area.

Embodiment 27. The method according to any one of Embodiments 14-26, wherein transporting the vehicle to the work region comprises: providing a transport vehicle comprising a bed, the bed adapted to received and support a plurality of the turf maintenance vehicles; propelling the transport vehicle from a first location to a second location, the second location being in or proximate a first work region; and delivering a first turf maintenance vehicle from the bed to the first work region.

Embodiment 28. The method according to Embodiment 27, further comprising: returning the transport vehicle to a location at or near the first work region; and returning the first turf maintenance vehicle from the first work region to the bed of the transport vehicle.

Embodiment 29. The method according to Embodiment 28, comprising: propelling the transport vehicle to a third location; and delivering the first turf maintenance vehicle from the bed to a second work region.

Embodiment 30. The method according to any one of Embodiments 27-29, further comprising replenishing the container of the first turf maintenance vehicle with additional treating material stored on the transport vehicle.

Embodiment 31. The method according any one of Embodiments 27-30, further comprising communicating status information between the first turf maintenance vehicle and the transport vehicle.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. An autonomous ground maintenance system comprising:
    a vehicle comprising a chassis supported upon a ground surface by ground support members;
    a container supported by the chassis, the container defining a discharge outlet operable to disperse treating material held within the container to a target area of the ground surface;
    a gate adapted to selectively open and close the discharge outlet;
    a sensor adapted to identify the target area, wherein the target area comprises natural turf; and
    an electronic controller supported by the chassis, the controller in communication with the sensor and the gate, wherein the controller is adapted to: position the chassis at a location proximate the target area such that the discharge outlet is capable of delivering the treating material to the target area; and energize the gate to open the discharge outlet.

2. The system according to claim 1, further comprising a grooming tool connected to the chassis and adapted to distribute the treating material in and around the target area.

3. The system according to claim 1, wherein the sensor comprises an image sensor adapted to identify a difference in contrast, color, or reflectivity between the target area and the surrounding ground surface.

4. The system according to claim 1, wherein the sensor comprises a depth sensor.

5. The system according to claim 1, wherein the sensor comprises either a thermal sensor or an acoustic sensor.

6. The system according to claim 1, wherein the sensor comprises a radio detection and ranging device.

7. The system according to claim 1, wherein the sensor comprises a spectral reflectance measurement sensor.

8. The system according to claim 1, wherein the treating material comprises any one, or a combination, of soil, granular fertilizer, or liquid fertilizer.

9. A method of operating an autonomous turf maintenance vehicle, the method comprising:
    establishing a work region in which the vehicle will operate, the work region comprising a turf surface;
    transporting the vehicle to the work region, the vehicle comprising:
        a chassis supported upon the turf surface by ground support members, wherein one or more of the ground support members comprises a drive member adapted to propel and steer the vehicle over the turf surface;
        one or more motors adapted to power the drive member;
        a container supported by the chassis, the container comprising a discharge outlet operable to transfer treating material held within the container to a target area of the turf surface;
        a sensor adapted to identify the target area, wherein the target area comprises natural turf; and
        an electronic controller supported by the chassis, the controller in communication with the sensor and the one or more motors;
    autonomously propelling the vehicle across the work region; and
    autonomously identifying, with the sensor, the target area.

10. The method according to claim 9, further comprising recording a location of the target area within a memory of the controller.

11. The method according to claim 9, further comprising transmitting data regarding a location of the target area to a remote computer.

12. The method according to claim 9, further comprising:
    positioning, under control of the controller, the discharge outlet of the container relative to the target area;
    selectively opening, under control of the controller, a gate associated with the discharge outlet to disperse the treating material in and around the target area; and
    closing, under control of the controller, the gate.

13. The method according to claim 12, wherein the vehicle further comprises a grooming tool, and wherein the method further comprises manipulating the grooming tool with the vehicle to smooth the treating material dispersed in and around the target area.

14. The method according to claim 12, further comprising recording a time and date at which the treating material was dispersed in and around the target area.

15. The method according to claim 12, further comprising metering the treating material dispersed through the discharge outlet.

16. The method according to claim 15, wherein metering the treating material dispersed through the discharge outlet comprises metering the treating material based upon one or both of: time; and a position of the discharge outlet.

17. The method according to claim 15, further comprising measuring a depth of the target area with a depth sensor and calculating, with the controller, a volume of treating material to be metered to the target area.

18. The method according to claim 9, wherein transporting the vehicle to the work region comprises:
    providing a transport vehicle comprising a bed, the bed adapted to receive and support a plurality of the turf maintenance vehicles;
    propelling the transport vehicle from a first location to a second location, the second location being in or proximate a first work region; and
    delivering a first turf maintenance vehicle from the bed to the first work region.

19. The method according to claim 18, further comprising:
    returning the transport vehicle to a location at or near the first work region; and
    returning the first turf maintenance vehicle from the first work region to the bed of the transport vehicle.

20. The method according to claim 19, comprising:
    propelling the transport vehicle to a third location; and
    delivering the first turf maintenance vehicle from the bed to a second work region.

* * * * *